United States Patent
Li et al.

(10) Patent No.: US 9,922,237 B2
(45) Date of Patent: Mar. 20, 2018

(54) FACE AUTHENTICATION SYSTEM

(71) Applicant: HITACHI, LTD., Tokyo (JP)

(72) Inventors: Zisheng Li, Tokyo (JP); Tsuneya Kurihara, Tokyo (JP); Harumi Kiyomizu, Tokyo (JP); Tatsuhiko Kagehiro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/117,795

(22) PCT Filed: Feb. 26, 2014

(86) PCT No.: PCT/JP2014/054670
§ 371 (c)(1),
(2) Date: Aug. 10, 2016

(87) PCT Pub. No.: WO2015/128961
PCT Pub. Date: Sep. 3, 2015

(65) Prior Publication Data
US 2016/0371535 A1    Dec. 22, 2016

(51) Int. Cl.
G06K 9/00    (2006.01)
G07C 9/00    (2006.01)
G06K 9/62    (2006.01)

(52) U.S. Cl.
CPC ..... *G06K 9/00228* (2013.01); *G06K 9/00288* (2013.01); *G06K 9/6203* (2013.01); *G07C 9/00158* (2013.01)

(58) Field of Classification Search
CPC .......... G06K 9/00228; G06K 9/00288; G06K 9/6203; G07C 9/00158
See application file for complete search history.

(56) References Cited

U.S. PATENT DOCUMENTS

2007/0098230 A1    5/2007  Norita et al.
2007/0122011 A1*   5/2007  Takizawa .......... G07C 9/00158
                                                     382/118
(Continued)

FOREIGN PATENT DOCUMENTS

JP    09-198531 A    7/1997
JP    11-161791 A    6/1999
(Continued)

OTHER PUBLICATIONS

Lanitis et al, "A Generic System for Classifying Variable Objects Using Flexible Template Matching," 1993, British Machine Vision Conference (BMVC), 11 pages.*

(Continued)

*Primary Examiner* — David F Dunphy
(74) *Attorney, Agent, or Firm* — Baker Botts L.L.P.

(57) ABSTRACT

A face authentication system of an example of the present invention includes: a first face area detection unit configured to detect a first face image from a first captured image captured by a camera; a first deformation unit configured to deform the first face image non-linearly using a template face image; a face image recording unit configured to record the deformed first face image as a registered face image; a second face area detection unit configured to detect a second face image from a second captured image captured by a camera; a second deformation unit configured to deform the second face image non-linearly using the template face image; and a face image matching unit configured to compare the deformed second face image with the registered face image.

12 Claims, 12 Drawing Sheets

(56) References Cited

U.S. PATENT DOCUMENTS

2009/0067681 A1 3/2009 Michaeli
2012/0269440 A1 10/2012 Miyano
2013/0266195 A1* 10/2013 Shiell ................. G06K 9/00281
    382/118

FOREIGN PATENT DOCUMENTS

| JP | 2004-118731 A | 4/2004 |
|---|---|---|
| JP | 2007-122454 A | 5/2007 |
| WO | WO 2006/109291 A1 | 10/2006 |
| WO | WO 2011/065130 A1 | 6/2011 |

OTHER PUBLICATIONS

International Search Report, dated May 27, 2014, which issued during the prosecution of International Application No. PCT/JP2014/054670, which corresponds to the present application.
Extended European Search Report, dated Oct. 2, 2017, which issued during the prosecution of European Application No. 14883850.1, which corresponds to the present application.
B. Leroy et al., "Face Identification by Deformation Measure" International Conference on Pattern Recognition, vol. 3, Jan. 1, 1996, pp. 633-637, XP0055406716.
T. Cootes et al., "Active Appearance Models" IEEE Transactions on Pattern Analysis and Machine Intelligence, vol. 23, No. 6, Jun. 1, 2001, pp. 681-685, XP055249235.
A. Lanitis et al., "Automatic face identification system using flexible appearance models" Image and Vision Computing, vol. 13, No. 5, Jun. 1995, pp. 393-401, XP055078921.

\* cited by examiner

FACE AUTHENTICATION SYSTEM

CROSS REFERENCE TO PRIOR APPLICATIONS

This application is a U.S. National Phase application under 35 U.S.C. §371 of International Application No. PCT/JP2014/054670, filed on Feb. 26, 2014. The International Application was published in Japanese on Sep. 3, 2015 as WO 2015/128961 A1 under PCT Article 21(2). The contents of the above applications are hereby incorporated by reference.

BACKGROUND OF THE INVENTION

The present invention relates to technology for capturing and registering a face image and authenticating the identity of a user with the face image.

Counterterrorism and crime control in public facilities have increasingly become significant issues for years. For this reason, biometric authentication utilizing biometric information (such as finger prints, veins, and faces) has attracted attention; particularly, face authentication has got high expectations. Face authentication has superiority to the other biometric authentication in view of an advantage that the person to be identified does not need to do authentication operation because the face image can be captured from a distant place. Accordingly, wider application is expected, inclusive of major application to border security and security surveillance.

A face image-based personal authentication system preparatorily inputs and registers a face image of an individual user as dictionary information. For example, when a user is going to use a facility, the authentication system captures a face image of the user and compares the captured face image with the registered face image to determine whether the user is the identical person.

Such an existing authentication system requires the user to stop in front of the camera of the authentication system and look at the lens of the camera to have a face image captured when registering the face and verifying the face. Unconscious personal authentication that captures a face image without user's notice and reduces the variation in position or facial expression is difficult to achieve with the existing authentication system.

To address the above-described issue, Patent Literature 1 discloses a technique to correct the variation in position or expression by fitting three-dimensional measurement data of a face acquired from captured face images to a three-dimensional model prepared in advance.

Patent Literature 1: JP 2007-122454 A

SUMMARY OF THE INVENTION

The authentication system described in Patent Literature 1 concurrently uses a plurality of cameras to capture the user's face for the three-dimensional face authentication and reconfigures the acquired plurality of images of the face three-dimensionally to create three-dimensional measurement data of the face. The three-dimensional reconfiguration requires precise determination of two-dimensional coordinates of a large number of feature points provided in the characteristic parts of the face in each input image. In the situation where the user's position and expression are changing, the precise detection of the feature points is very difficult.

Accordingly, desired is a face authentication technique robust against the variation in position or expression.

A face authentication system of an aspect of the present invention includes: a first face area detection unit configured to detect a first face image from a first captured image captured by a camera; a first deformation unit configured to deform the first face image non-linearly using a template face image; a face image recording unit configured to record the deformed first face image as a registered face image; a second face area detection unit configured to detect a second face image from a second captured image captured by a camera; a second deformation unit configured to deform the second face image non-linearly using the template face image; and a face image matching unit configured to compare the deformed second face image with the registered face image.

An aspect of the present invention enables face authentication robust against the variation in position or expression.

DETAILED DESCRIPTION OF THE EMBODIMENTS

Hereinafter, embodiments of the present invention will be described with reference to the accompanying drawings. It should be noted that the embodiments are merely examples to implement the present invention and are not to limit the

Embodiment 1

Overview

The face registration apparatus and the face authentication apparatus in this embodiment non-linearly deform the arrangement of the facial parts, the sizes of the facial parts, the shapes of the facial parts, the size of the face, and the shape of the face, on each of the face images for registration and the face images for authentication. In the deforming, the face registration apparatus and the face authentication apparatus use a common standard template face image created in advance as a reference face image.

Non-linear deformation with reference to a template image enables creation of face images suitable for authentication from the face images for registration and face images for authentication in which the faces look in different directions or the faces are located at different positions, so that the authentication accuracy will improve. This technique reduces the effects of variation in orientation of the user's face or expression in the user's face at capturing the face image of the user, achieving highly accurate face authentication even if the user does not pay attention to being photographed in face registration and face authentication.

Configuration and Operations

Figure 1A:
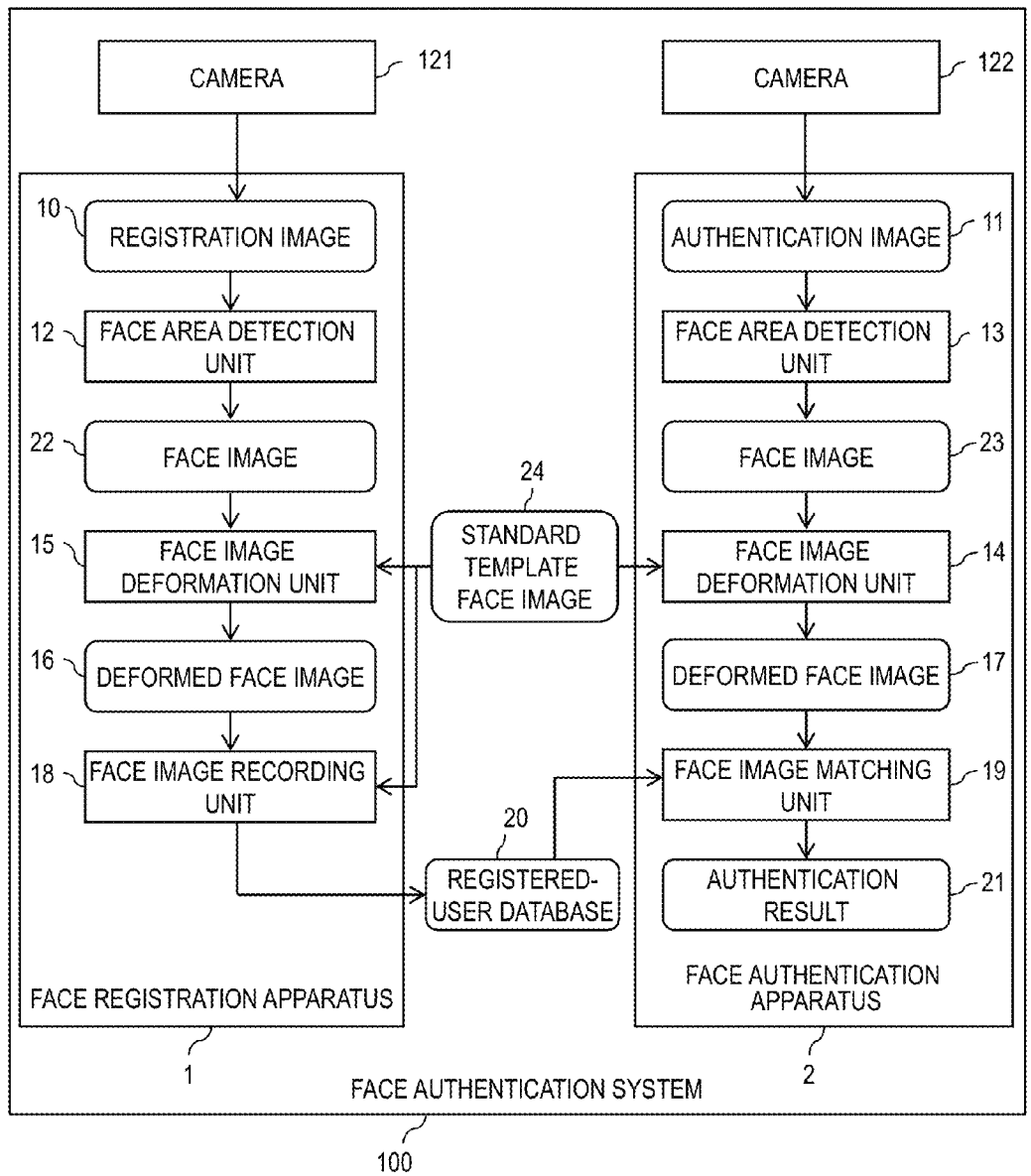
FIG. 1A is a block diagram for illustrating a logical configuration of a face authentication system in Embodiment 1.

FIG. 1A is a block diagram for illustrating a logical configuration of a face authentication system in this embodiment. The face authentication system 100 in this embodiment includes cameras 121 and 122, a face registration apparatus 1, and a face authentication apparatus 2. The face registration apparatus 1 includes a face area detection unit 12, a face image deformation unit 15, and a face image recording unit 18. The face authentication apparatus 2 includes a face area detection unit 13, a face image deformation unit 14, and a face image matching unit 19.

The face authentication system 100 further includes a registration image 10 input to the face registration apparatus 1, an authentication image 11 to be used by the face authentication apparatus 2, a standard template face image 24 created in advance, and a registered-user database 20. In the example described hereinafter, the standard template face image and registration face images are two-dimensional images.

Figure 1B:
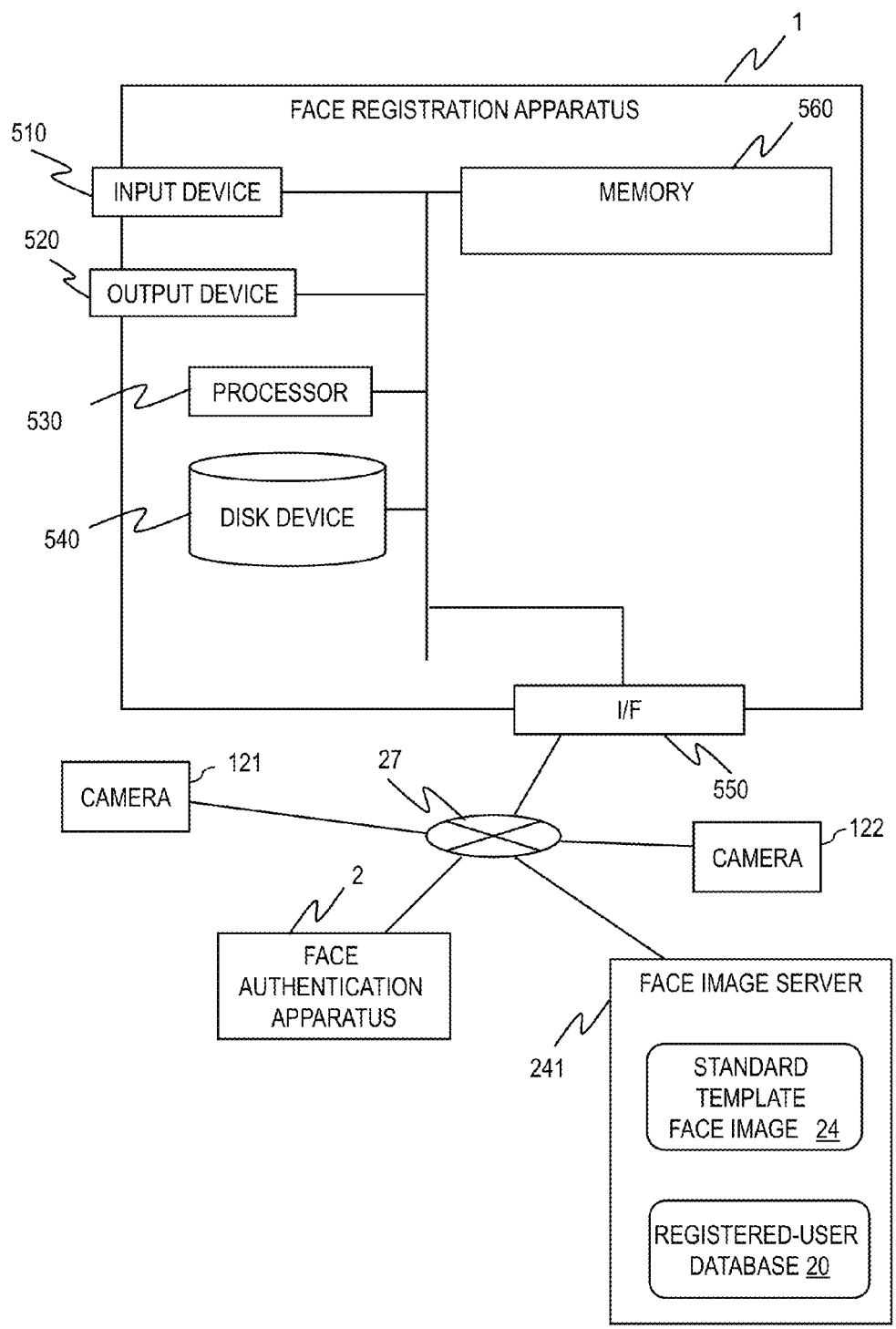
FIG. 1B is a block diagram for illustrating a hardware configuration of a face registration apparatus and a face authentication apparatus in Embodiment 1.

FIG. 1B illustrates an example of a hardware configuration of the face authentication system 100. The registered-user database 20 and the standard template face image 24 are stored in a volatile storage device or a non-volatile storage device in the face image server 241. The cameras 121 and 122, the face registration apparatus 1, the face authentication apparatus 2, and the face image server 241 are connected with each other via a network 27.

FIG. 1B provides an example of a hardware configuration of the face registration apparatus 1. The face authentication apparatus 2 and the face image server 241 can have the same configuration as the face registration apparatus 1. The face registration apparatus 1 includes an input device 510, an output device 520, a processor 530, a disk device 540, an interface (I/F) 550, and a memory 560.

The input device 510 is a device for the administrator to input information to the face registration apparatus 1. The input device 510 can be, for example, a keyboard, a pointing device, a switch, a touch panel, or a microphone. The output device 520 is a device for the face registration apparatus 1 to output information to the administrator. The output device 520 can be, for example, a monitor display, a speaker, or a printer.

The processor 530 controls operations of the face registration apparatus 1 in accordance with a program or computational parameters stored in the memory 560 to implement the functions illustrated in FIG. 1A. Specifically, the processor 530 works as the function units in accordance with a face area detection program, a face image deformation program, and a face image recording program.

The disk device 540 is a physical storage device. The disk device 540 can be, for example, an HDD (Hard Disk Drive) or an SSD (Solid State Drive) and stores necessary programs and computational parameters.

The memory 560 holds programs to implement the functions illustrated in FIG. 1A. The memory 560 holds application programs to implement the functions illustrated in FIGS. 1A and 1n addition, programs required for the operations in the system, inclusive of an OS. The I/F 550 is a communication interface to communicate with other apparatuses via the network 27.

In the face authentication apparatus 2, the face area detection unit 13, the face image deformation unit 14, and the face image matching unit 19 can be implemented with the processor operating in accordance with programs. At least a part of the function units of the face registration apparatus 1 and the face authentication apparatus 2 may be configured with hardware designed with an integrated circuit.

The face registration apparatus 1 and the face authentication apparatus 2 in FIG. 1B are implemented in different computers; however, they can be included in a single computer. The standard template face image 24 and the registered-user database 20 can be included in either computer. For example, the registered-user database 20 may be stored in the face registration apparatus 1 and the standard template face image 24 may be stored in the face authentication apparatus 2.

Figure 2:
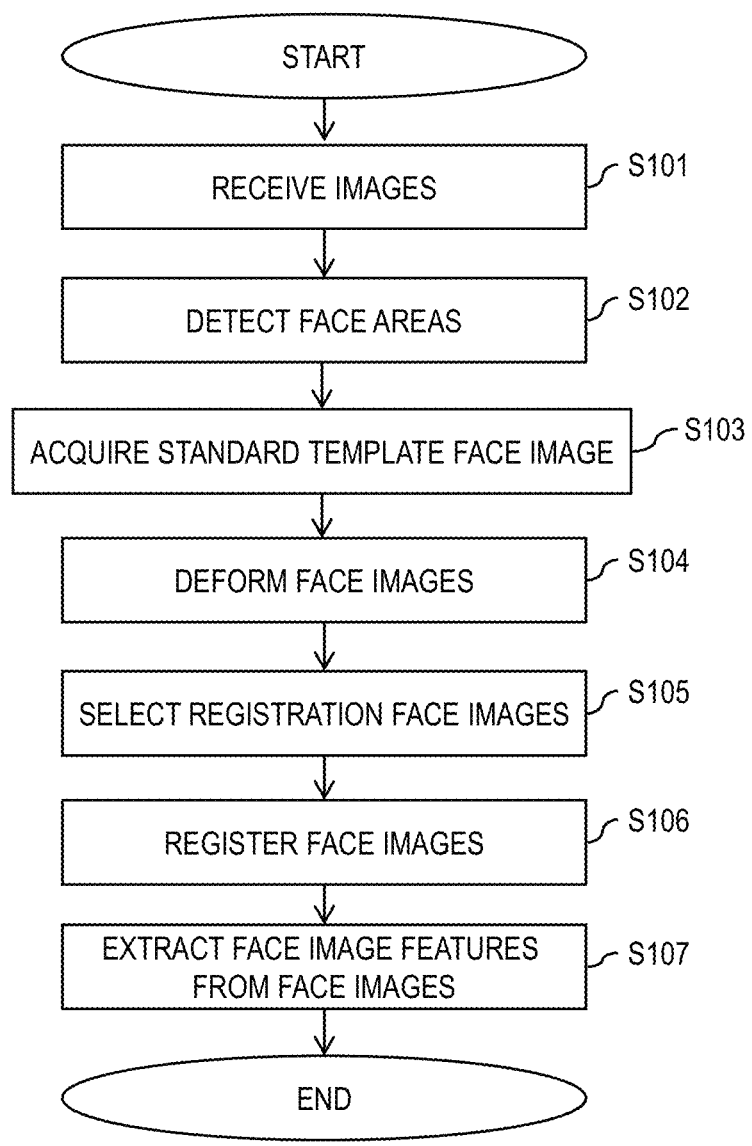
FIG. 2 is a flowchart of face registration processing in Embodiment 1.
Figure 3:
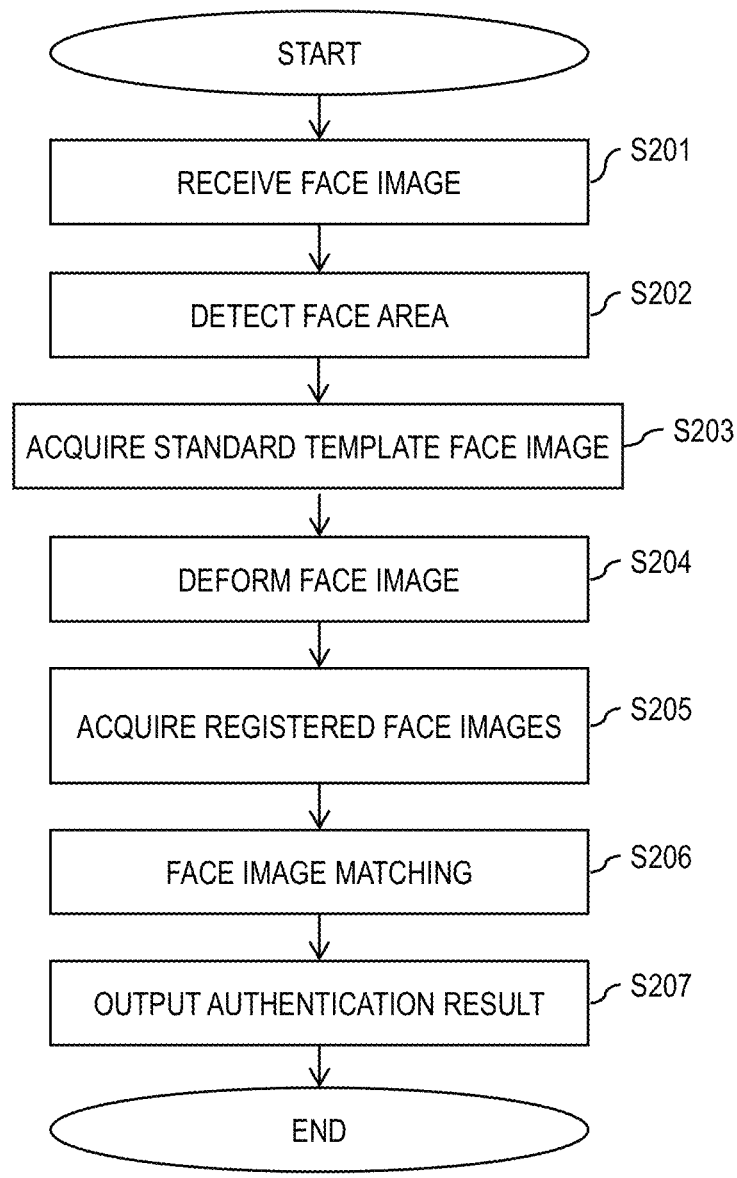
FIG. 3 is a flowchart of face authentication processing in Embodiment 1.

Next, operations of this embodiment are described based on FIGS. 1A and 1B and the flowcharts of FIGS. 2 and 3. First, operations of the face registration apparatus 1 shown in FIG. 2 are described. The face registration apparatus 1 receives a registration image 10 taken by the camera 121 via the network 27. The registration image 10 is input to the face area detection unit 12 (S101). The face area detection unit 12 detects the face area of the user to be registered from the registration image 10 and creates a face image 22 of the face area (S102). The face area detection unit 12 feeds the created face image 22 to the face image deformation unit 15.

The face image deformation unit 15 acquires the standard template face image 24 created in advance from the face image server 241 via the network 27 (S103). The standard template face image 24 is an average face image created by, for example, synthesizing a plurality of face images of different persons. Using an average face image as the standard template face image 24 enables creation of a registration face image more suitable for face authentication, for each of different users. The standard template face image 24 can be a face image of a specific person.

The face image deformation unit 15 deforms the face image 22 non-linearly using the standard template face image 24. The standard template face image 24 is the reference image and the face image 22 is the floating image. The face image deformation unit 15 applies non-rigid deformation incorporated with non-linear deformation. The face image deformation unit 15 non-linearly deforms the arrangement of the facial parts, the sizes of the individual facial parts, the shapes of the individual facial parts, and the shape of the face in the face image 22 to create a deformed face image 16 (S104). The face image deformation unit 15 feeds the created deformed face image 16 to the face image recording unit 18.

The non-rigid deformation is deformation other than rigid deformation. Rigid deformation applies only translation and rotation. The non-linear deformation is deformation other than linear deformation. Linear deformation includes scaling and shearing in addition to translating and rotating.

The camera 121 takes a plurality of registration images 10 and feeds them to the face image deformation unit 15. The face image deformation unit 15 creates a plurality of deformed face images 16 from the plurality of registration images 10 and feeds the plurality of deformed face images 16 to the face image recording unit 18.

The face image recording unit 18 receives a plurality of deformed face images 16 fed in a predetermined period and calculates the similarity of these deformed face images 16 to the standard template face image 24. The face image recording unit 18 selects a predetermined number of deformed face images in descending order of the similarity to the standard template face image 24 (S105).

The face image recording unit 18 records the selected deformed face images to the registered-user database 20 as registration face images of the user (S106). Moreover, the face image recording unit 18 extracts image features from each of the registration face images and registers the feature values to the registered-user database 20 (S107). The selected deformed face images and their image feature values are sent to the face image server 241 via the network 27.

Next, operations of the face authentication apparatus 2 illustrated in FIG. 3 are described. The face authentication apparatus 2 receives an authentication image 11 taken by the camera 22 via the network 27. The authentication image 11 is fed to the face area detection unit 13 (S201). The face area detection unit 13 detects the face area of the user to be identified from the authentication image 11, creates a face image 23 (S202), and feeds the face image 23 to the face image deformation unit 14.

The face image deformation unit 14 acquires the standard template face image 24 created in advance from the face image server 241 via the network 27 (S203). Although this example uses a standard template face image 24 common to the face registration apparatus 1 and the face authentication apparatus 2, the standard template face image for the face authentication apparatus 2 may be different from the standard template face image for the face registration apparatus 1.

The face image deformation unit 14 deforms the face image 23 non-linearly using the standard template face image 24. The standard template face image 24 is the reference image and the face image 23 is the floating image. The face image deformation unit 15 applies non-rigid deformation incorporated with non-linear deformation. The method (algorithm) of the deformation can be the same as or different from the method in the face registration apparatus 1.

The face image deformation unit 14 non-linearly deforms the arrangement of the facial parts, the sizes of the individual facial parts, the shapes of the individual facial parts, and the shape of the face in the face image 23 to create a deformed face image 17 (S204). The face image deformation unit 14 feeds the created deformed face image 17 to the face image matching unit 19.

The face image matching unit 19 acquires a plurality of registered face images from the registered-user database 20 and compares the deformed face image 17 with each of the registered face images (S206). The face image matching unit 19 outputs the authentication result obtained by the comparison to an output device or another program (S207). Specifically, the face image matching unit 19 determines whether the deformed face image 17 matches any of the registered face images. For example, if the similarity between the deformed face image 17 and a registered face image reaches a specified level, the face image matching unit 19 determines that the two images are a match. The face image matching unit 19 verifies that the user is a registered user if the deformed face image 17 matches a registered face image.

Hereinafter, some steps in the processing in FIGS. 2 and 3 are described in detail.

Face Area Detection Unit

The step of face area detection S102 by the face area detection unit 12 is described. The face area detection unit 13 can create a face image 23 from an authentication image 11 using the same method as the face area detection unit 12 (S202).

The face area detection unit 12 receives a registration image 10, locates an image area corresponding to the face area in the registration image 10, and cuts out the located image area from the registration image 10 to create a face image 22.

Known techniques can be used to detect a face area. For example, a Haar-like detector can be used for a known technique. Viola-Jones method is an example of a technique to detect a face area. The face area detection unit 12 transforms a face area detected from a registration image 10 to an image having a predetermined image size and feeds it to the face image deformation unit 15 as a face image 22.

Face Image Deformation Unit

The step of face image deformation S104 by the face image deformation unit 15 is described. The face image deformation unit 14 can create a deformed face image 17 from a face image 23 using the same method as the face image deformation unit 15 (S204). The face image deformation unit 14 may use an algorithm different from the algorithm of the face image deformation unit 15.

The face image deformation unit 15 acquires a created face image 22 and the standard template face image 24. The face image deformation unit 15 deforms the arrangement of the facial parts, the sizes of the facial parts, the shapes of the facial parts, and the shape of the face non-linearly using the standard template face image 24 as a reference image to create a deformed face image 16.

The face image deformation unit 15 can use known face image deformation techniques. For example, free-form deformation (FFD)-based non-rigid deformation can be used as a known face image deformation technique. Thin-Plate Splines (TPS) can also be used. The TPS calculates a continuous warp of a plane including scattered point data and minimizes the bending energy of the plane to interpolate the scattered point data on the plane.

Hereinafter, the FFD-based non-rigid deformation is described as an example of non-rigid deformation incorporated with non-linear deformation. The face image deformation unit 15 registers control points on a face image in the FFD-based non-rigid deformation. The FFD-based non-rigid deformation deforms the face image by moving the control points. This approach leads to appropriate and efficient deformation computation.

The face image deformation unit 15 deforms the face image 22 to raise the similarity between the face image 22 and the standard template face image 24. For example, the face image deformation unit 15 obtains the image similarity between the deformed face image 22 and the standard template face image 24 and conducts optimization calculation based on the obtained image similarity. The optimization calculation provides the shift amounts (deformation amounts) to shift the control points for the further deformation. The shift amount for each control point can be expressed in a vector representing the direction to shift and the distance to shift.

The face image deformation unit 15 calculates the shift amounts for the pixels between control points through interpolation of the shift amounts for the control points provided around the pixels. The face image deformation unit 15 transforms the coordinates on the face image 22 using the acquired shift amounts for the pixels to deform the face image 22. All the pixels may be selected as control points.

The face image deformation unit 15 repeats deformation of the face image 22 to obtain the final version of deformed face image 16. The optimization calculation will be described later. As described above, the face image deformation unit 15 locally deforms the face image 22 to register the face image 22 to the standard template face image 24. Moreover, multiresolution deformation is available by changing the intervals between control points or the number of control points.

Figure 4:
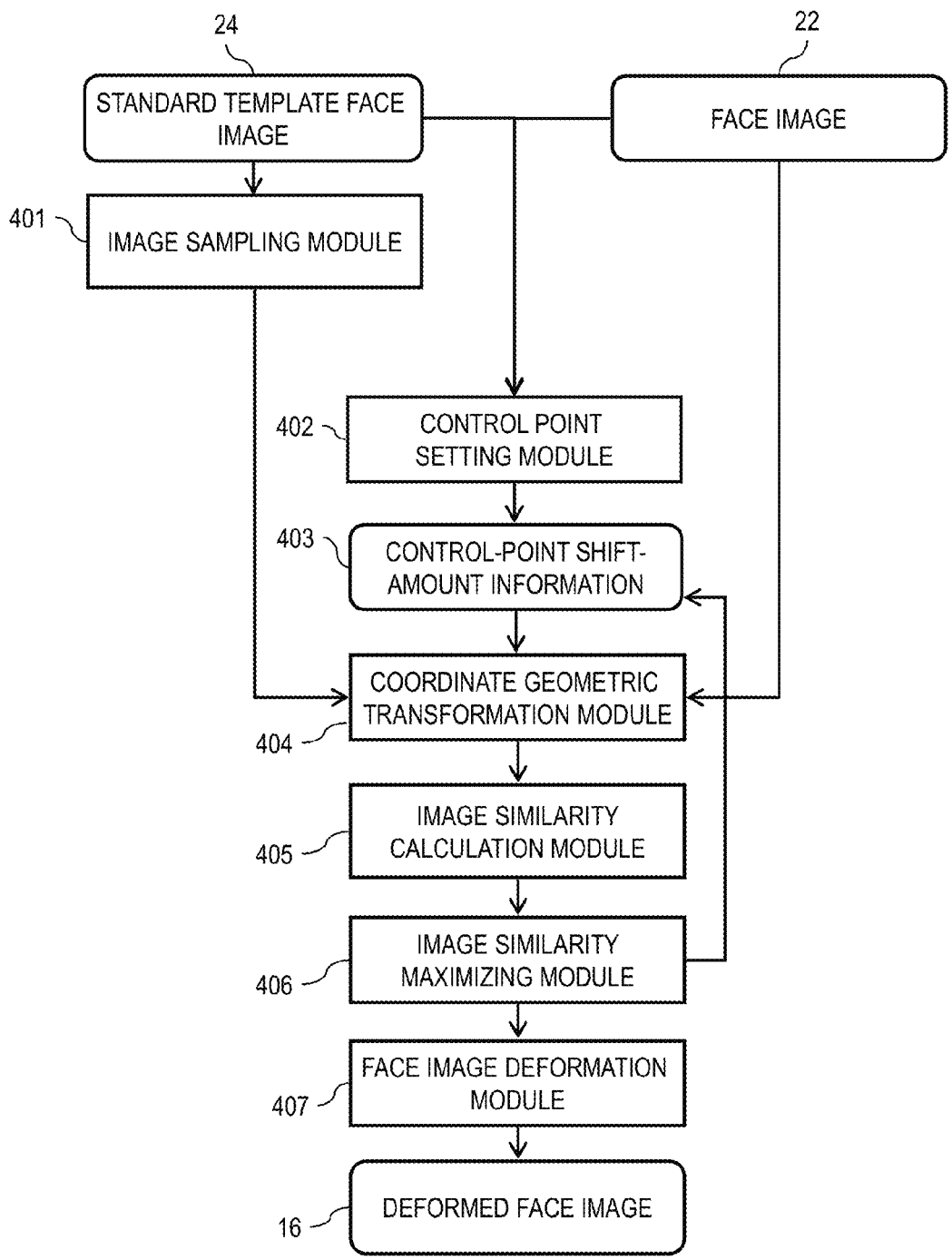
FIG. 4 is a block diagram for illustrating a logical configuration of a face image deformation unit.

FIG. 4 is a block diagram for illustrating a logical configuration of the face image deformation unit 15 employing FFD. The face image deformation unit 15 includes an image sampling module 401, a control point setting module 402, a coordinate geometric transformation module 404, an image similarity calculation module 405, an image similarity maximizing module 406, and a face image deformation module 407.

Figure 5:
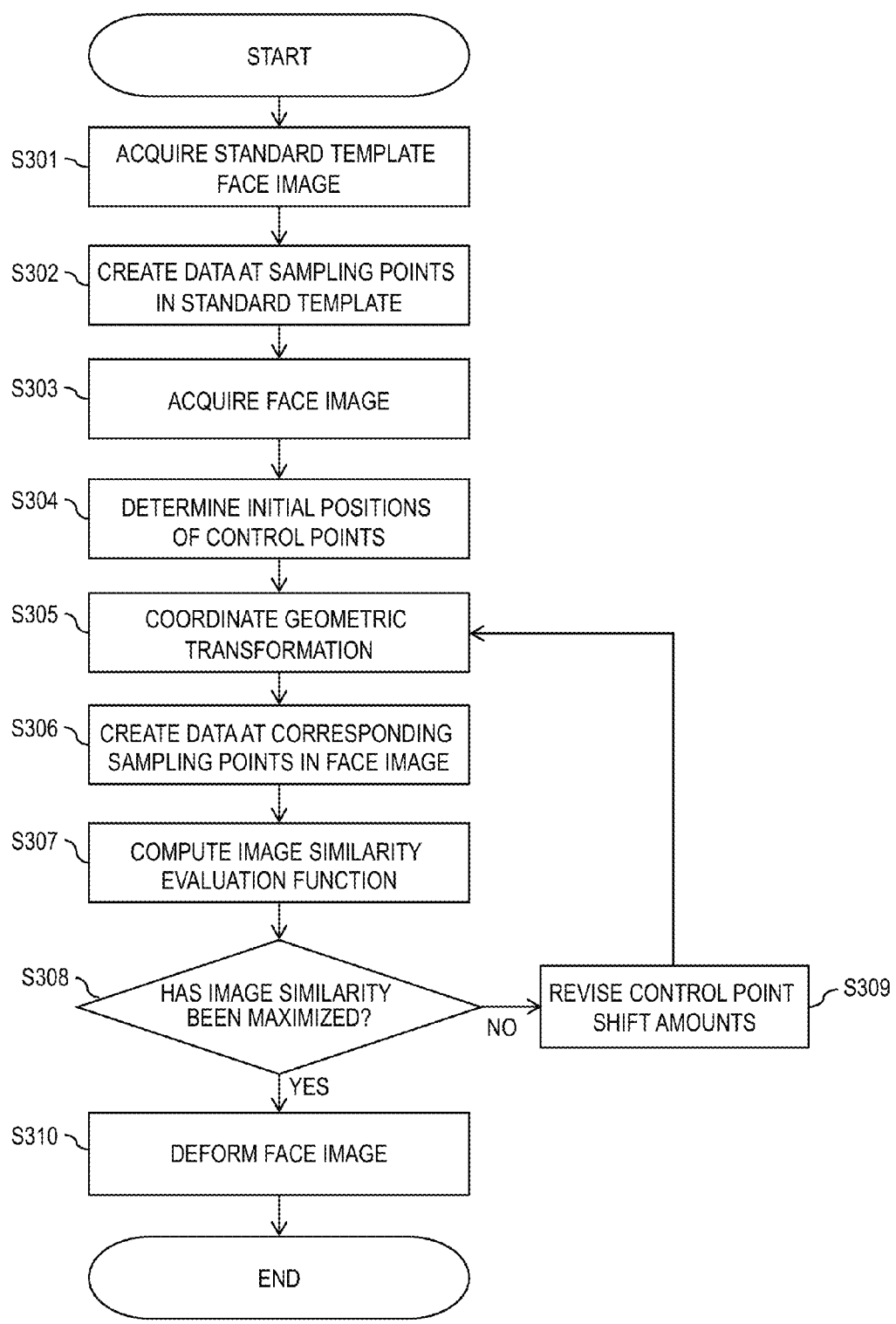
FIG. 5 is a flowchart of face image deformation processing.
Figure 6:
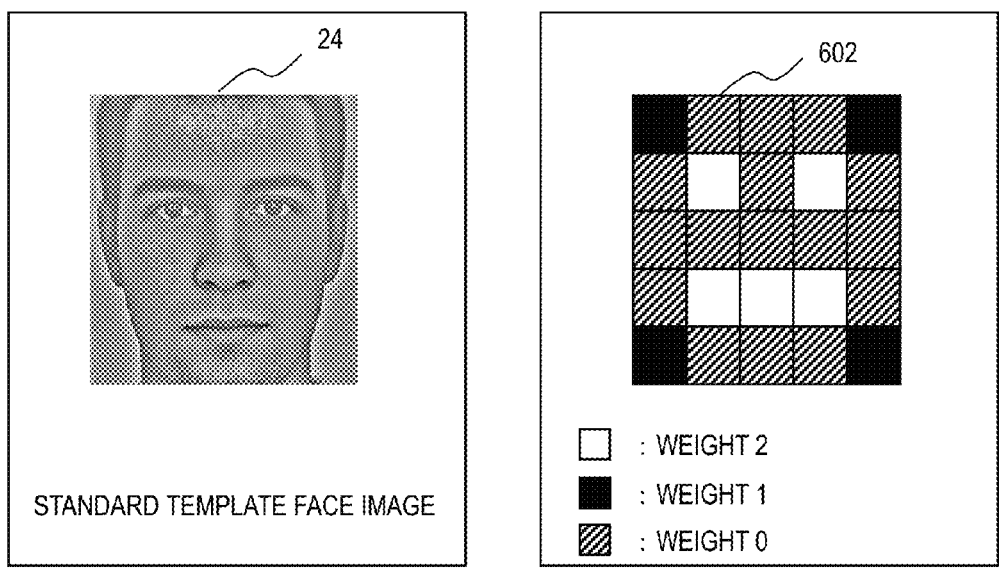
FIG. 6 is an explanatory diagram of a standard template face image and a sampling mask indicating the weights to the numbers of sampling points.

Next, operations of the face image deformation unit 15 is described based on the block diagram of FIG. 4, the flowchart of FIG. 5, and the explanatory diagram of FIG. 6. The image sampling module 401 extracts sampling data at image sampling points from the standard template face image 24 and outputs the sampling data to the coordinate geometric transformation module 404 (S301 and S302). The sampling data is used to calculate the image similarity between the face image 22 and the standard template face image 24 in the non-rigid deformation.

The image sampling points can be all the pixels in the image area subjected to the non-rigid deformation. However, to expedite the non-rigid deformation, the image sampling module 401 can put a grid on the image and select the pixels on the cross-points as sampling points.

Alternatively, the image sampling module 401 can generate a predetermined number of random coordinates in a sampling target area and select the pixels at the generated coordinates as image sampling points. The luminance values at the generated coordinates are sampling data. In generating a predetermined number of coordinates for the sampling points, the image sampling module 401 can assign a different weight to the number of sampling points in each sub-area and generate coordinates for the sampling points at random in each sub-area. This configuration improves the accuracy and robustness in the non-rigid deformation of face images.

An example of weighting the sub-areas is described. FIG. 6 includes an example of the standard template face image 24 and an example of a sampling mask 602 for indicating the weights to the numbers of sampling points in the standard template.

The brightness of each divided block (sub-area) represents a weight to the number of sampling points in the block. For example, the weights of the black blocks are 0, the weights of the hatched blocks are 1, and the weights of the white blocks are 2. For example, the characteristic parts (such as the eyes, the eyebrows, the nose, and the mouth) are weighted higher and the other parts are weighted lower.

The image sampling module 401 selects a larger number of sampling points from the highly-weighted blocks. That is to say, the number of sampling points in a block assigned a high weight is larger than the number of sampling points in a block assigned a low weight. The numbers of sampling points in equally-weighted blocks may be the same or different. In each block, pixels at random coordinates can be selected.

Next, the control point setting module 402 places control points on the input face image 22 (S303 and S304), creates control-point shift-amount information 403, and outputs the information to the coordinate geometric transformation module 404. The control-point shift-amount information 403 indicates the shift amount from the initial position for each of the control points.

The initial positions of the control points can be placed on a grid. Alternatively, to increase the accuracy and the speed of the non-rigid deformation, the control point setting module 402 can extract feature point pairs corresponding to each other from the standard template face image 24 and the face image 22 and determine the initial positions of the control points using the positional information of the acquired feature point pairs. The feature points can be detected from the positions of the characteristic facial parts (such as the eyes, the eyebrows, the nose, and the mouth). For example, the control point setting module 402 locates the feature points in the face image 22 corresponding to specific feature points (pixels) in the standard template face image 24 and defines the located feature points (pixels) as control points.

The coordinate geometric transformation module 404 acquires the face image 22 and the coordinates of the sampling points in the standard template face image 24. The coordinate geometric transformation module 404 further acquires the control-point shift-amount information 403. The coordinate geometric transformation module 404 applies coordinate transformation to the coordinates of the sampling points of the standard template face image 24 using the control-point shift-amount information 403 (S305).

The coordinate transformation at Step S305 calculates the coordinates on the pre-deformation face image 22 corresponding to the coordinates of the sampling points in the standard template face image 24. That is to say, the coordinate transformation calculates the coordinates on the pre-deformation face image 22 to be shifted to the coordinates of the sampling points through the deformation of the face image 22. These coordinates on the pre-deformation face image 22 are the coordinates of the corresponding sampling points in the face image 22.

With respect to the coordinates of a sampling point, the coordinate geometric transformation module 404 interpolates the coordinates between control points near the sampling point using a known B-spline function to calculate the coordinates of the corresponding sampling point in the pre-deformation face image 22.

For example, the coordinate geometric transformation module 404 calculates the coordinates on the pre-deformation face image 22 where to shift the sampling point through interpolation operations. The coordinate geometric transformation module 404 calculates the inverse vector of the vector defined by the coordinates of the original sampling point and the coordinates of the sampling point after being shifted. The coordinate geometric transformation module 404 adds the inverse vector to the coordinates of the original sampling point to calculate the coordinates of the corresponding sampling point in the pre-deformation face image 22.

The coordinates of a corresponding sampling point may not be the same as the coordinates of the pixel. The coordinate geometric transformation module 404 therefore calculates the luminance value at the corresponding sampling point (data at the corresponding sampling point) using linear interpolation operations for each of the corresponding sampling points (the points corresponding to the sampling points in the standard template face image 24) in the face image 22 (S306).

Through the foregoing steps, the coordinates (corresponding sampling points) of the corresponding sampling points in the face image 22 that are to be shifted with the shift of the control points and the luminance values at the coordinates (corresponding sampling points). That is to say, deformation of the floating image 22 caused by the shift of the control points is performed in the coordinate geometric transformation module 404.

The image similarity calculation module 405 acquires the data (sampling data) at the sampling points in the standard template face image 24 and the data at the corresponding sampling points in the geometrically transformed face image 22 (data created at Step S306). The image similarity calculation module 405 applies a predetermined evaluation function to the luminance values at these sampling points to calculate the image similarity between the standard template face image 24 and the deformed face image 22 (S307). The image similarity calculated with the predetermined evaluation function can be a known measure, such as a residual sum of squares, a normalized cross-correlation function, or mutual information. The mutual information is an index for indicating to what extent one image can express the other image.

The image similarity maximizing module 406 acquires the image similarity between the standard template face image 24 and the face image 22 calculated by the image similarity calculation module 405. The image similarity maximizing module 406 performs convergent calculation to obtain the shift amounts for the control points with which the image similarity between the standard template face image 24 and the face image 22 becomes the highest (or maximum) (S308).

If the image similarity does not converge at Step S308, the image similarity maximizing module 406 revises the control-point shift-amount information 403 to attain a higher image similarity (S309). Then, the face image deformation unit 15 performs Steps S305 to S308 again using the revised control-point shift-amount information 403.

To revise the control-point shift-amount information 403, the image similarity maximizing module 406 calculates the similarity with a multivariable function. Each variable is the shift amount for each control point. The image similarity maximizing module 406 calculates the optimum shift amount for each control point using a recursion method to maximize the function. The recursion method can be L-BFGS (limited-memory Broyden-Fletcher-Goldfarb-Shanno). The image similarity maximizing module 406 can hold in advance a plurality of patterns of shift amounts for the control points and revises the control-point shift-amount information 403 in accordance with the patterns in turn.

If the image similarity has converged at Step S308, the image similarity maximizing module 406 outputs the control-point shift-amount information 403 to the face image deformation module 407.

The face image deformation module 407 acquires the face image 22 and the control-point shift-amount information 403. The face image deformation module 407 calculates the coordinates of every pixel in the face image 22 with the interpolation operations based on the control-point shift-amount information 403, like at Step S305. Subsequently, the face image deformation module 407 calculates the luminance value of every pixel at the original coordinates before the shift in the image obtained by shifting all the pixels with the interpolation operations like at Step S306 to create the deformed face image 16 (S310).

Face Image Recording Unit

The face image recording unit 18 in the face registration apparatus 1 acquires deformed face images 16 created from a plurality of registration images 10 of the same user to be registered successively captured by the camera 121 in a predetermined period and calculates the image similarity between each of these deformed face images 16 and the standard template face image 24. The face image recording unit 18 can calculate the similarity using the same method as the method of the image similarity calculation module 405 and use known mutual information to represent the image similarity.

Next, the face image recording unit 18 selects a predetermined number of deformed face images 16 from these deformed face images 16 in the descending order of the similarity to the standard template face image 24 (S105) and records them to the registered-user database 20 as registered face images of the user (S106). The face image recording unit 18 further extracts image features from the selected registered face images and records the feature values to the registered-user database 20.

The image features can be known Local Binary Pattern (LBP) features. Creating a plurality of deformed face images 16 from a plurality of captured images allows selection of face images suitable to be registered. Preparing a plurality of registered face images allows selection of a more suitable registered face image in authentication processing.

Face Image Matching Unit

The face image matching unit 19 in the face authentication apparatus 2 acquires a deformed face image 17 (authentication face image and information (registered face images and feature values) stored in the registered-user database 20 from the face image server 241. The face image matching unit 19 performs face image matching of the deformed face image 17, determines whether the user is a registered user (S206), and outputs the authentication result 21 (S207).

More specific description is provided. The face image deformation unit 14 in the face authentication apparatus 2 has the same configuration and uses the same method as the face image deformation unit 15 to deform an authentication face image 23 and create a deformed face image 17. The coordinates of the sampling points and the initial positions of the control points can be common to the face image deformation units 14 and 15. Otherwise, the face image deformation unit 14 can deform a face image with a different method from the method of the face image deformation unit 15. For example, the face image deformation unit 14 may compare all the pixels without selecting sampling points.

The registered-user database 20 stores a plurality of registered face images for each of a plurality of users. The face image matching unit 19 performs face image matching between the deformed face image 17 and each of the registered face images.

The face image matching unit 19 extracts image features from a deformed face image 17 and individually calculates the similarity to the image features of the registered face images recorded in the registered-user database 20. The face image matching unit 19 compares these similarity values with a predetermined threshold to obtain the result of the matching. The face image matching unit 19 includes the registered face images having similarity higher than the threshold and the similarity in the authentication result 21.

As mentioned above, the features can be LBP features, for example. The similarity for the LBP features can be the known chi-square distance. The registered-user database can store personal information including the identification information on the registered users; the face image matching unit 19 can include the personal information on the registered users corresponding to the selected registered face images in the result of the matching.

Summary

This embodiment non-linearly deforms face images to be registered and face images to be authenticated with reference to the standard template face image. This configuration reduces the effect of the variation in orientation of the user's face or expression in the user's face in the face image authentication to achieve accurate authentication even if the user does not look at the camera consciously in registration or authentication.

Embodiment 2

Overview

The face authentication apparatus 2 in this embodiment extracts image features from the authentication face image and calculates the distances from the image features of the registered face images to select the registered face images of the candidates for the registered user corresponding to the user being authenticated. The authentication apparatus 2 non-linearly deforms the authentication face image with reference to each acquired registered face image, extracts image features again, calculates the distance from the image features of the registered image, and outputs the result of the face authentication.

Configuration and Operations

Figure 9:
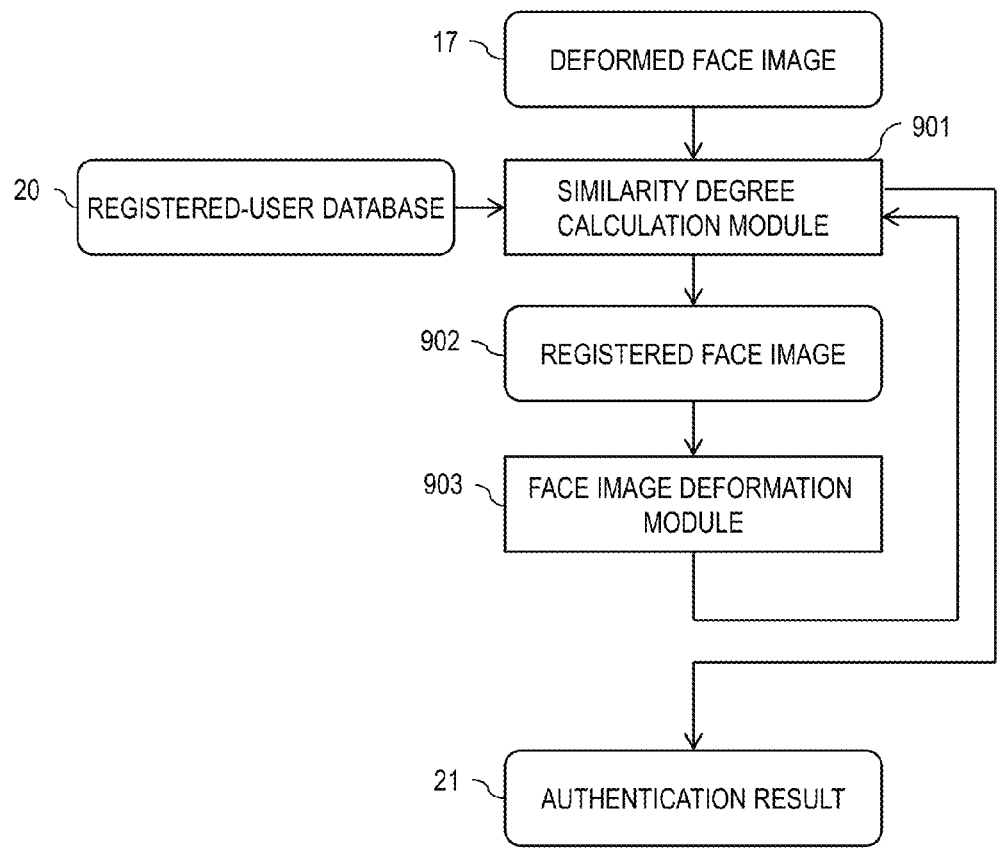
FIG. 9 is a block diagram for illustrating a logical configuration of a face image matching unit in Embodiment 2.

FIG. 9 is a block diagram for illustrating a logical configuration of a face image matching unit 19 in Embodiment 2. The face image matching unit 19 includes a similarity calculation module 901 and a face image deformation module 903. In FIG. 9, the deformed image 17 is a face image created by the face image deformation unit 14 for authentication. The registered-user database 20 stores face images of registered users recorded by the face registration apparatus 1 and feature values of the face images.

Figure 7:
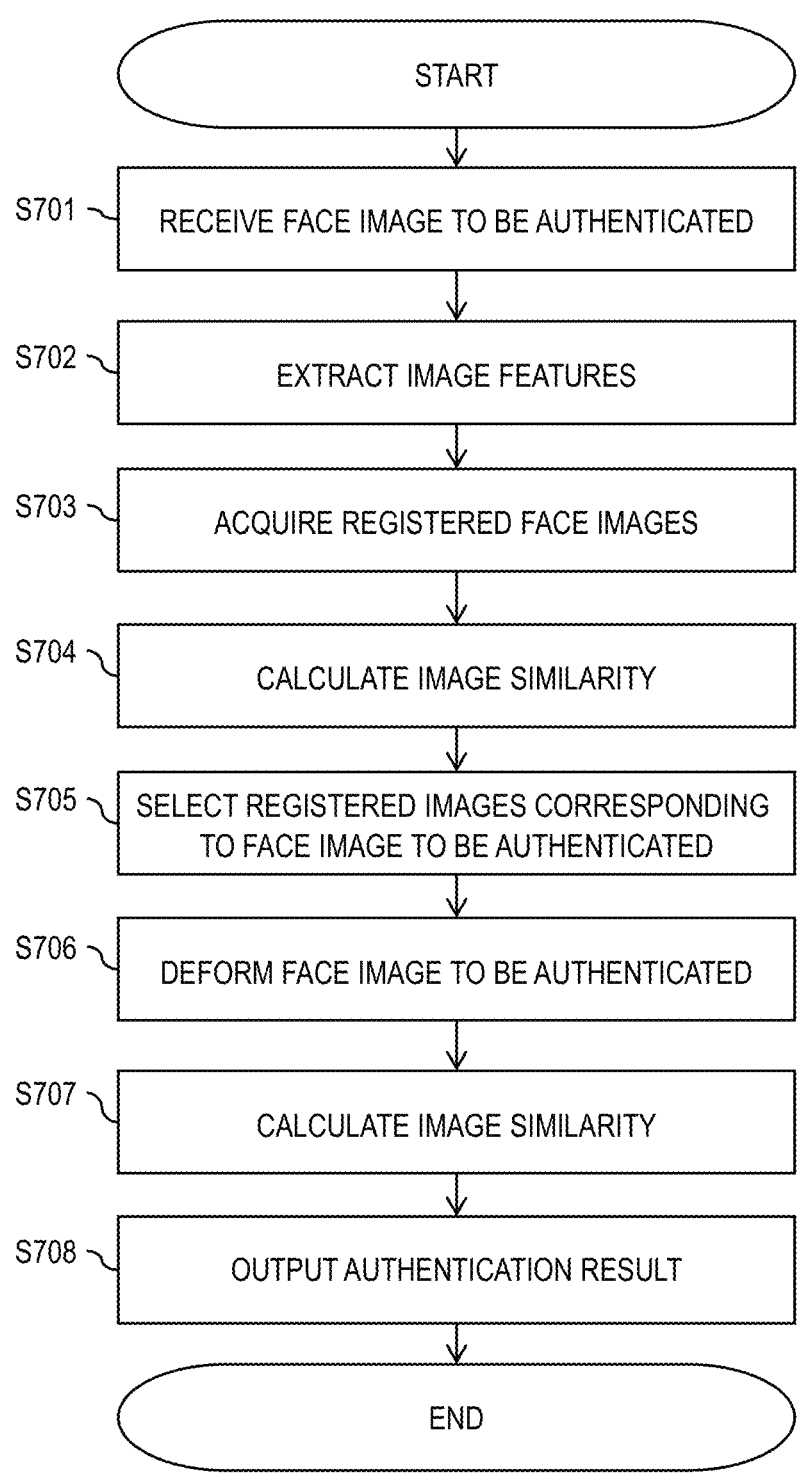
FIG. 7 is a flowchart of face image matching in Embodiment 2.
Figure 8:
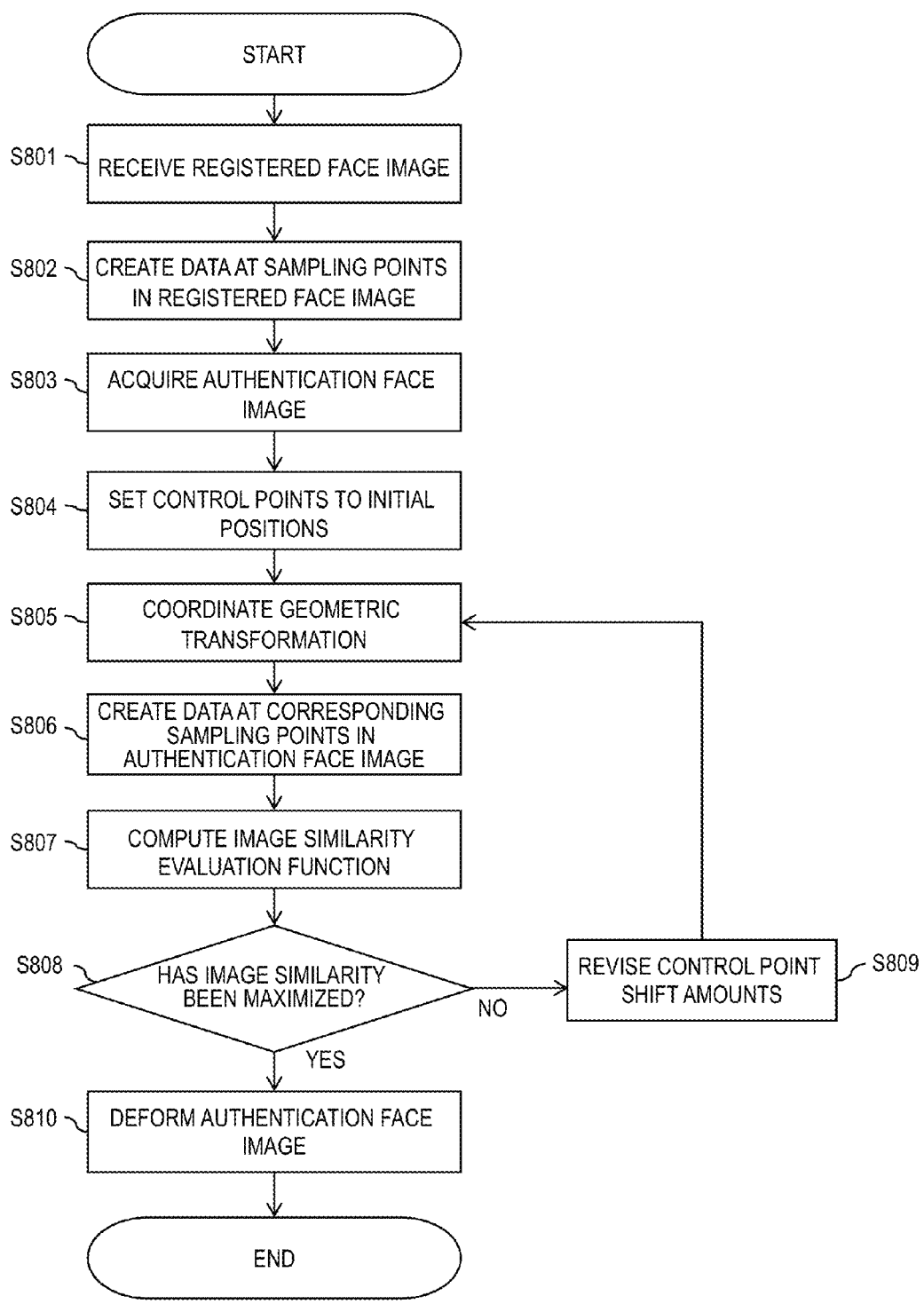
FIG. 8 is a flowchart of face image deformation processing in Embodiment 2.

Next, with reference to the block diagrams of FIGS. 1 and 9 and the flowcharts of FIGS. 7 and 8, operations in this embodiment are described. The similarity calculation module 901 acquires a deformed face image 17 obtained from an authentication image as a face image to be authenticated (S701) and extracts LBP features as image features (S702). Next, the similarity calculation module 901 acquires information stored in the registered-user database 20 and calculates the similarity between the LBP features of the authentication face image 17 and the LBP features of each of the registered face images recorded in the registered-user database 20 (S704).

The similarity calculation module 901 selects registered face images 902 corresponding to the image to be authenticated (the registered face images closer to the authentication face image in similarity) (S705) and outputs the registered face images 902 to the face image deformation module 903. The similarity calculation module 901 may select registered face images 902 of one or more of registered users.

With reference to each of the selected registered face images 902, the face image deformation module 903 deforms the authentication face image 17 (S706). The method of the face image deformation module 903 to deform the authentication face image (S706) can be the same as the method described in Embodiment 1.

The similarity calculation module 901 re-extracts image features in LBP features from the obtained deformed authentication face image and the selected registered face image, calculates the similarity between the acquired features (S707), determines whether the user is identical to the registered user, and outputs the determination as an authentication result 21 (S708).

FIG. 8 illustrates the deformation processing for the authentication face image. The face image deformation module 903 acquires one of the registered face images 902 selected at Step S705 (S801) and creates data at image sampling points (S802) like at the above-described Step S302. The face image deformation module 903 acquires the deformed face image 17 as authentication face image (S803) and sets deformation control points to the initial positions (S804) like at Step S304.

Next, the face image deformation module 903 applies coordinate geometric transformation same as the processing at Step S305 to the authentication face image 17 (S805) and calculates the luminance values at the corresponding sampling points (sampling points corresponding to the sampling points in the registered face image 902) in the deformed authentication face image 17 (S806) like at Step S306.

The face image deformation module 903 applies a predetermined evaluation function to the luminance values at the sampling points to calculate the image similarity between the registered face image 902 and the deformed authentication face image 17 (S807) like at Step S307.

Next, the face image deformation module 903 performs convergent calculation to obtain the shift amounts for the control points with which the image similarity between the registered face image 902 and the deformed authentication face image 17 becomes the highest (or maximum) (S808) like at Step S308.

If the image similarity does not converge at Step S808, the face image deformation module 903 revises the control-point shift-amount information to attain higher image similarity (S809). Then, the face image deformation module 903 performs Steps S805 to S808 again.

If the image similarity has converged at Step S808, the face image deformation module 903 deforms the authentication face image 17 using the obtained control-point shift-amount information to create a deformed image (S810).

Summary

As described above, the face authentication apparatus in Embodiment 2 acquires an authentication face image and selects registered face images of candidates for the registered user corresponding to the person to be authenticated. The face authentication apparatus non-rigidly deforms the authentication face image using each of the obtained registered face images as a reference image. The face authentication apparatus performs matching of the obtained deformed authentication face image with the registered face images of the candidates for the registered user corresponding to the user to be authenticated and outputs the face authentication result. This configuration raises the image similarity between the deformed authentication face image and the registered face image if the person to be authenticated and the registered user are the same person, improving the accuracy in face authentication furthermore.

Applied Examples

Figure 10:
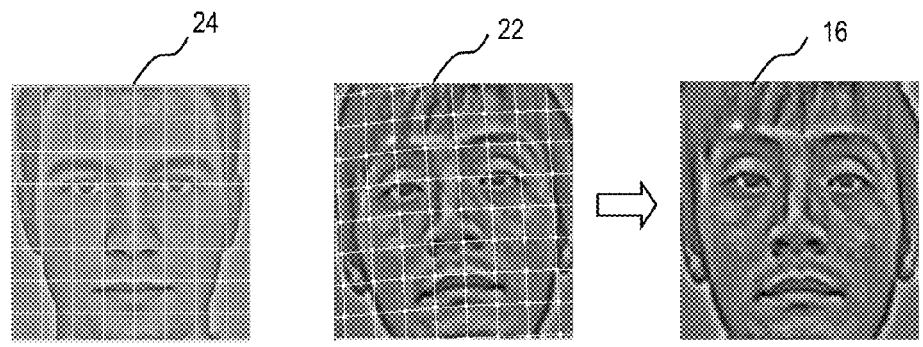
FIG. 10 is a set of explanatory views including examples of images in deformation of a face image to be registered in Embodiment 1 and Embodiment 2.
Figure 11:
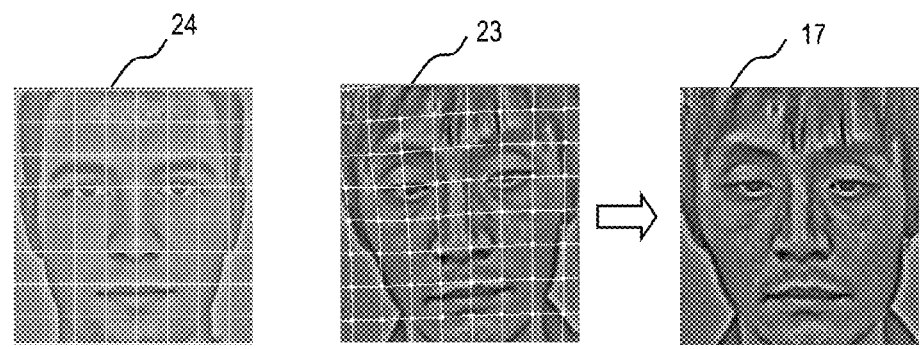
FIG. 11 is a set of explanatory views including examples of images in deformation of a face image to be authenticated in Embodiment 1 and Embodiment 2.
Figure 12:
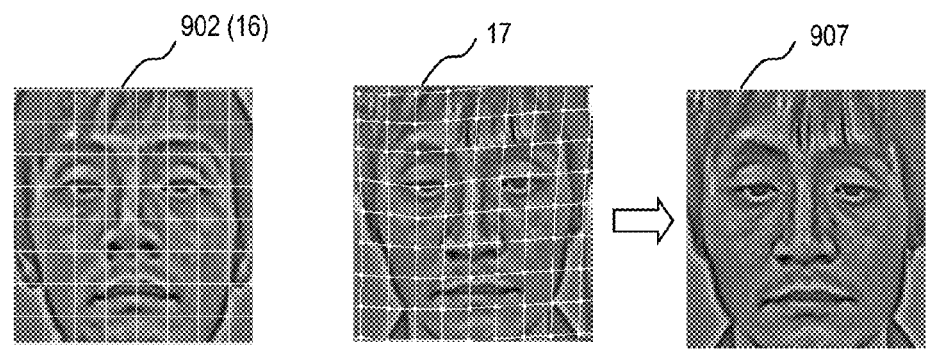
FIG. 12 is a set of explanatory views including examples of images in deformation of a face image performed in face image matching in Embodiment 2.

Applied examples where the deformation processing has been applied to face images are described with FIGS. 10 to 12. FIG. 10 includes examples of a standard template face image 24, a registration face image before being deformed or a face image 22, and a deformed face image 16 after the face image 22 is deformed. The standard template face image 24 is provided with control points on a grid. The face image 22 undergoes the deformation of Steps S301 to S310. The control points are provided at the positions where the deformation has converged.

Before starting deformation, the control points are provided at initial positions (on the grid). The control points shown on the standard template face image 24 are provided at the initial positions. The control points shown on the face image 22 are provided at the positions where the deformation has converged. The convergent position and the initial position of a control point derive a control-point shift vector. The shift vectors are used to calculate where to shift each pixel in the face image 22. The luminance value at the destination of each pixel is calculated through interpolation and the obtained luminance value is set to the initial position of each pixel. When the luminance values of all the pixels are calculated, the deformed image 16 is obtained.

FIG. 11 includes examples of a standard template face image 24, an authentication face image before being deformed or a face image 23, and a deformed face image 17 after the face image 23 is deformed. The standard template face image 24 is provided with control points on a grid. The face image 23 undergoes the deformation of Steps S301 to S310. The control points on the pre-deformation face image 23 are provided at the positions where the deformation has converged.

FIG. 12 includes an example of a deformed face image 16, or an example of a registered face image 902 recorded in the registered-user database 20 and selected at Step S705. FIG. 12 further includes an example of a deformed face image 17 or an authentication face image and an example of a deformed face image of the authentication face image (deformed authentication face image 907).

The deformation of Step S706 (that is to say, Steps S801 to S810) is applied to the authentication face image (deformed face image 17) and the deformed authentication face image 907 is created. The control points on the deformed face image 17 are provided at the positions where the deformation has converged. A registered face image 902 and the deformed authentication face image 907 are input to the similarity calculation module 901 and an authentication result is obtained through the processing of Step S707.

Embodiment 3

Overview

The system in Embodiment 3 of the present invention uses the face authentication system 100 in Embodiment 1 or Embodiment 2 to provide access control or a service to the users of a room or a facility. Each user needs to pass ID authentication before entering the room or the facility. When the user enters the room or the facility, the face registration apparatus acquires face images of the user and records them to the registered-user database. For the user to exit or re-enter the facility after once entered or to receive a service in the facility, the face authentication apparatus is used.

Configuration and Operations

Figure 13:
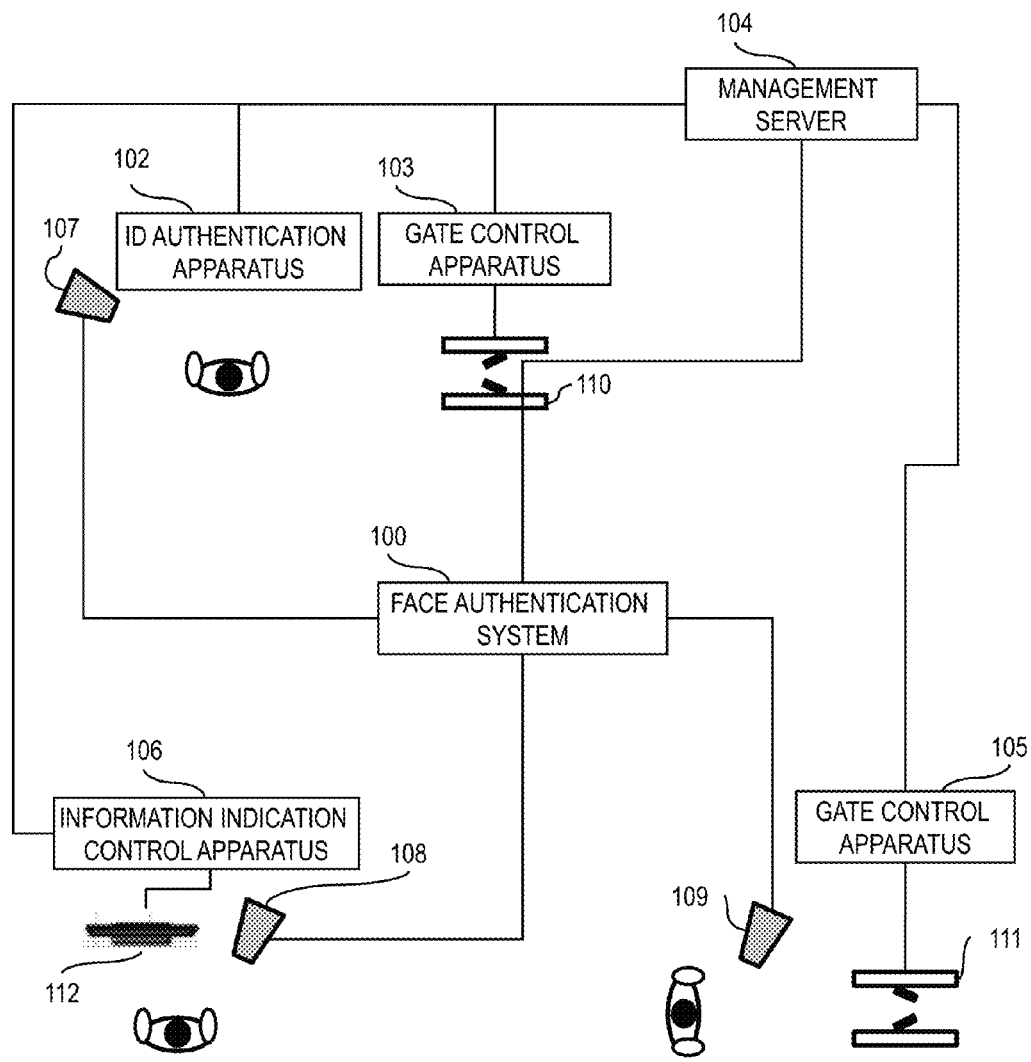
FIG. 13 is a block diagram for illustrating a logical configuration of an access control and service providing system in Embodiment 3.

FIG. 13 is a block diagram for illustrating a logical configuration in this embodiment. This embodiment includes a face authentication system 100, an ID authentication apparatus 102, a gate control apparatus 103, a management server 104, a gate control apparatus 105, an information indication control apparatus 106, a camera 107, a camera 108, a camera 109, a gate 110, a gate 111, and an information indication apparatus 112.

Regarding the access control and service providing system using biometric authentication in this embodiment, applications to boarding on a flight or information indication service at an airport are described by way of representative examples.

Hereinafter, operations of this embodiment are described based on the block diagram of FIG. 13.

The management server 104 connects to the face authentication system 100, the ID authentication apparatus 102, the gate control apparatus 103, the gate control apparatus 105, and the information indication control apparatus 106 to update the registered-user database, log authentication results of the users, and manage the face registration and face authentication apparatuses, the ID authentication apparatus, the gate control apparatus, and the information indication control apparatus.

The ID authentication apparatus 102 works as a check-in apparatus at the airport to authenticate each passenger, issue an authentication ID of the passenger instead of a ticket, and send the authentication ID to the management server 104. The management server 104 records the authentication ID of the passenger and sends a control signal to unlock the gate to the gate control apparatus 103. The gate control apparatus 103 acquires the unlock control signal and unlocks the gate 110 to allow the passenger to enter the airport.

For the ID authentication, highly precise biometric authentication such as finger vein authentication may be employed. For example, the airline company registers personal information, flight information, and biometric information of finger veins for a passenger in advance. The passenger needs to pass finger vein authentication with the ID authentication apparatus 102 to enter the airport. For the modality for the biometric information, fingerprints, iris, palm, or voice can be employed, other than the finger veins. The ID authentication apparatus 102 may accept password entry by the passenger without using biometric authentication.

When the passenger is admitted by the ID authentication apparatus 102, the management server 104 acquires the authentication ID of the passenger from the ID authentication apparatus 102 and records the authentication ID. Next, the management server 104 sends a control signal to the face authentication system 100 to register face images of the passenger. Upon receipt of the control signal from the management server 104, the face authentication system 100 activates the camera 107 to capture face images of the passenger as registration images.

The face authentication system 100 applies the above-described processing of Steps S101 to S107 to the obtained registration images and sends the deformed face images of the passenger and the face image features to the management server 104. The management server 104 acquires the registration face images of the passenger and the face image features and records them to the registered-user database together with the authentication ID of the passenger.

The face authentication system 100 continuously acquires images captured by the camera 108 installed near the information indication apparatus 112 in the airport. The face authentication system 100 performs face authentication processing of Steps S201 to S207 to authenticate a passenger who stops in front of the information indication apparatus 112 and notifies the management server 104 of the result. The management server 104 stores the record of authentication of the passenger and sends a control signal and electronic information for the particular passenger to the information indication control apparatus 106. Upon receipt of the control signal and the electronic information for the particular passenger, the information indication control apparatus 106 controls the information indication apparatus 112 to show the information to the passenger.

The face authentication system 100 acquires images captured by the camera 109 installed near the boarding gate 111 and when the passenger boards a flight or leaves the airport, performs the face authentication processing of Steps S201 to S207. If the authenticated person is confirmed as the passenger, the face authentication system 100 sends the authentication result to the management server 104. The management server 104 stores the authentication record of the passenger and sends a control signal to the gate control apparatus 105. Upon receipt of the control signal, the gate control apparatus 105 unlocks the gate 111 to allow the passenger to board the flight.

Summary

As described above, this embodiment provides access control or a service to the users of a room or a facility with the face authentication system in Embodiment 1 or Embodiment 2. After the ID authentication apparatus authenticates a user who is going to enter the room or the facility, the face registration apparatus acquires face images of the user and records the face images to the registered-user database. Access control for the user to exit or re-enter the room or the facility or providing a service to the user after the user once enters the room or the facility is managed by the face authentication apparatus. This configuration provides low load and highly accurate face authentication for the user.

It should be noted that the present invention is not limited to the above-described embodiments but include various modifications. For example, the above-described embodiments have described details in order to describe the present invention for better understanding; they are not limited to those including all the configurations that have been described. A part of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A face authentication system comprising:
   a first face area detector for detecting a first face image from a first captured image;
   a first deformation processor for deforming the first face image non-linearly using a template face image;
   a face image recorder for recording the deformed first face image as a registered face image, wherein the face image recording unit is configured to record a plurality of deformed first face images obtained from a plurality of first captured images of a same person as registered face images;
   a second face area detector for detecting a second face image from a second captured image;
   a second deformation processor for deforming the second face image non-linearly using the template face image; and
   a face image matching processor for comparing the deformed second face image with at least one of the registered face images.

2. The face authentication system according to claim 1, wherein the first deformation processor is configured to:
   extract sampling points from the template face image;
   extract sampling points corresponding to the sampling points in the template face image from the deformed first face image;
   calculate similarity between the template face image and the deformed first face image using the sampling points extracted from the template face image and the sampling points extracted from the first face image; and
   re-deform the deformed first face image based on the similarity.

3. The face authentication system according to claim 2, wherein the first deformation processor is configured to:
   set control points to the first face image in order to deform the first face image; and
   deform the first face image by shifting the control points in the first face image.

4. The face authentication system according to claim 1, wherein the second deformation processor is configured to:
   extract sampling points corresponding to sampling points in the template face image from the deformed second face image;
   calculate similarity between the template face image and the deformed second face image using the sampling points extracted from the template face image and the sampling points extracted from the second face image; and
   re-deform the deformed second face image based on the similarity.

5. The face authentication system according to claim 4, wherein the first deformation processor and the second deformation processor are configured to:
   separate a face area of the template face image into a plurality of sub-areas; and
   determine a number of sampling points to be extracted from each of the plurality of sub-areas in accordance with a weight correspondingly assigned to each of the plurality of sub-areas.

6. The face authentication system according to claim 1, wherein the template face image is a face image created by synthesizing a plurality of different face images.

7. The face authentication system according to claim 1, wherein the second deformation processor is configured to deform the second face image deformed using the template face image non-linearly using the registered face image, and wherein the face image matching processor is configured to compare the second face image deformed using the registered face image with the registered face image.

8. A face authentication method comprising:
deting a first face image from each first captured image of a plurality of first captured images;
deforming, for each of a plurality of first face images, the first face image non-linearly using a template face image;
recording, for each of a plurality of deformed first face images obtained from each of a plurality of first captured images of a same person as registered face images, the deformed first face image as a registered face image;
detecting a second face image from a second captured image;
deforming the second face image non-linearly using the template face image; and
comparing the deformed second face image with the registered face image.

9. The face authentication method according to claim 8, wherein the deforming the first face image comprises:
extracting sampling points from the template face image;
extracting sampling points corresponding to the sampling points in the template face image from the deformed first face image;
calculating similarity between the template face image and the deformed first face image using the sampling points extracted from the template face image and the sampling points extracted from the first face image; and
re-deforming the deformed first face image based on the similarity, and
wherein the deforming the second face image comprises:
extracting sampling points from the template face image;
extracting sampling points corresponding to sampling points in the template face image from the deformed second face image;
calculating similarity between the template face image and the deformed second face image using the sampling points extracted from the template face image and the sampling points extracted from the second face image; and
re-deforming the deformed second face image based on the similarity.

10. The face authentication method according to claim 9, wherein the deforming the first face image comprises:
setting control points to the first face image in order to deform the first face image; and
deforming the first face image by shifting the control points in the first face image, and
wherein the deforming the second face image comprises:
setting control points to the second face image in order to deform the second face image; and
deforming the second face image by shifting the control points in the second face image.

11. The face authentication method according to claim 9, wherein each of deforming the first face image and deforming the second face image comprises:
separating a face area of the template face image into a plurality of sub-areas; and
determining a number of sampling points to be extracted from each of the sub-areas in accordance with a weight correspondingly assigned to each of the plurality of sub-areas.

12. The face authentication method according to claim 8, wherein the step of deforming the second face image includes deforming the second face image deformed using the template face image non-linearly using the registered face image, and
wherein the step of comparing includes comparing the second face image deformed using the registered face image with the registered face image.

* * * * *